Patented Aug. 28, 1945

2,383,444

UNITED STATES PATENT OFFICE 2,383,444

DICYANOETHYL ACETOACETIC ACID COMPOUNDS

Herman A. Bruson, Philadelphia, Pa., assignor to The Resinous Products & Chemical Company, Philadelphia, Pa., a corporation of Delaware No Drawing. Application March 28, 1942,
Serial No. 436,619

13 Claims. (Cl. 260—464)

This invention relates to ketonic dinitriles having the formula—

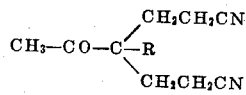

wherein R is a member of the group consisting of carboxylic ester and carboxylic substituted amide or imide radicals.

According to this invention, which is a continuation-in-part of copending application, Serial No. 389,332, filed April 19, 1941, acrylonitrile is condensed in the presence of an alkaline condensing agent with an acetoacetic acid derivative in the form of an ester or substituted amide of acetoacetic acid, whereby two cyanoethyl radicals are introduced on the active α-methylene carbon atom as follows—

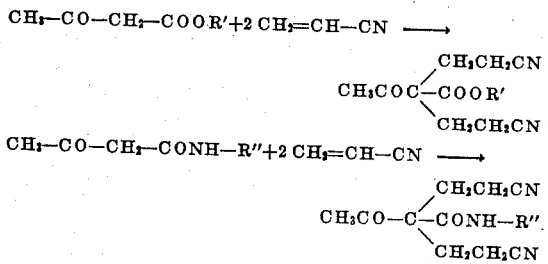

wherein R' and R'' represent alkyl, aryl, aralkyl, and cycloalkyl groups.

Typical acetoacetic acid compounds which can be used are the methyl, ethyl, isopropyl, butyl, benzyl or cyclohexyl esters, the anilide, chloro-anilide, ethyl amide, butylamide, laurylamide or cetyl amide, the di-chloro-anilide and homologues thereof. The exact nature of the ester group or amide group is not a determining factor in this reaction, any ester or substituted amide group being permissible.

Among the alkaline condensing agents which can be used are the oxides, hydroxides, hydrides, amides, and alcoholates of the alkali metals or the alkali metals themselves. There may also be used strongly basic non-metallic hydroxides such as quaternary ammonium hydroxides. Of these a particularly effective agent is the aqueous solution containing 40% of trimethyl benzyl ammonium hydroxide which is available commercially under the trade name "Triton B." One or several of these materials are suspended, or preferably dissolved in the acetoacetic compound itself or in a solution of the compound in a relatively inert liquid such as dioxane, ether, benzene or tertiary butyl alcohol. The quantity of alkaline condensing agent required is relatively small, amounts of the order of 1% to 10% on the combined weight of the reactants being sufficient. After the reaction is substantially complete it is often desirable to neutralize the reaction mixture before the desired product is isolated.

The condensation takes place readily at temperatures as low as 0° C. and is rapidly accelerated at temperatures from 25° to 60° C. While higher temperatures may be used, there is no advantage gained thereby because of the polymerizing tendency of the acrylonitrile. Polymerization may be inhibited, however, by use of stabilizing agents, such as hydroquinone or copper, as well as by controlling the reaction and reaction temperature. The reactions are usually exothermal so that cooling, at least, during the initial part of the condensation, is generally advantageous in order to control the vigor of the reaction and to prevent undesired polymerization or side reactions.

The di-β-cyanoethylation products of acetoacetic esters and substituted amides are useful as intermediates in the preparation of tricarboxylic acids and acid derivatives. They may find applications in many fields, including synthetic resins, plastics, plasticizers, pharmaceuticals, etc.

The invention is illustrated by the following examples—

*Example 1.*—To a solution of 58 g. of methyl acetoacetate, 100 g. of dioxane and 7 g. of aqueous 40% trimethylbenzyl ammonium hydroxide solution there was added dropwise 53 g. of acrylonitrile while the solution was stirred and cooled to 30–40° C. The mixture was stirred for one-half hour longer at room temperature and the crystalline product which resulted was filtered off. The yield was 54 g. A further quantity was isolated by adding water to the filtrate.

The substance formed colorless crystals melting at 154° C. after recrystallization from acetone. Its analysis corresponds to di-(β-cyanoethyl)-acetoacetic methyl ester.

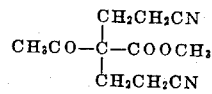

*Example 2.*—By using 65 g. of ethyl acetoacetate in place of the methyl acetoacetate in the above example, the corresponding di-(β-cyanoethyl)-acetoacetic ethyl ester separated as a crystalline mass when the reaction mixture was poured into one liter of ice water. After recrystallization from ethanol, the compound formed colorless crystals melting at 82° C.

In the same manner, other esters of acetoacetic acid may be used, for example, the isopropyl, the butyl, the benzyl, phenyl or cyclohexyl esters.

*Example 3.*—To a solution of 53.1 g. of acetoacetanilide in 100 g. of dioxane containing 2 g. of aqueous 40% trimethylbenzyl ammonium hydroxide solution there was added dropwise 31.8 g. of acrylonitrile while stirring and cooling to 30–33° C. When the exothermal reaction was finished, the mixture was warmed for 2½ hours at 45–50° C., then cooled, washed with water containing sufficient hydrochloric acid to neutralize the alkali, and finally thoroughly washed with water. The product separated as a heavy oil, which, after being dried on a steam bath under reduced pressure, formed a pale amber-colored, resinous mass. It was dissolved in hot ethanol from which it slowly crystallized on standing. The colorless, pure crystals obtained after repeated recrystallization from ethanol melted at 82° C. Analysis indicated the presence of two cyanoethyl groups corresponding to the formula:

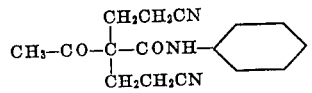

despite the fact that acetoacetanilide itself melts at 85° C. A mixed melting point of the two compounds, however, shows a big depression.

In the same manner, the ethylamide, butylamide, laurylamide or cetylamide of acetoacetic acid may be used in place of the anilide.

*Example 4.*—To a solution of 63.5 g. of ortho-chloroaceto-acetanilide, 100 g. of dioxane and 2 g. of aqueous 40% trimethylbenzyl ammonium hydroxide solution there was added dropwise, while the solution was stirred at 30–36° C., 31.8 g. of acrylonitrile. The mixture was then heated at 40–50° C. for three hours. The clear solution obtained was acidified with dilute hydrochloric acid, poured into ethylene dichloride and washed with water. The ethylene dichloride was then evaporated off, under reduced pressure, on a steam bath. There was obtained 92 g. of a pale amber, resinous syrup which became crystalline when it was dissolved in ethanol and chilled. Upon recrystallization from ethanol 66 g. of colorless crystals melting at 105° C. were obtained. Analysis indicated the presence of two cyanoethyl groups corresponding to the formula—

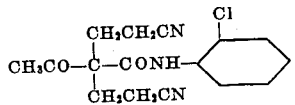

Despite the fact that ortho-chloro-acetoacetanilide itself melts at very nearly the same temperature, a mixed melting point of the two compounds shows a big depression.

*Example 5.*—A mixture consisting of 100 g. of dioxane, 3 g. of aqueous 38% trimethyl benzyl ammonium hydroxide solution and 73.8 g. of 2,5-dichloro-acetoacetanilide was stirred and warmed to 40° C. while 31.8 g. of acrylonitrile was gradually added. The mixture was heated 2½ hours at 40–45° C., then cooled, neutralized with dilute hydrochloric acid, taken up in ethylene dichloride, and washed with water. The ethylene dichloride layer was separated and evaporated to dryness in vacuo on a steam bath. The residue, weighing 89 g., was a viscous, sticky balsam which did not readily crystallize. On standing in chilled ethanol solution for some time, it gradually solidified to a crystalline mass which, after several recrystallizations from ethanol, formed colorless crystals melting at 121° C., containing by analysis two cyanoethyl radicals and having the formula—

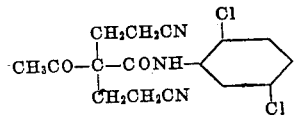

I claim:
1. As a new compound, a substance having the formula

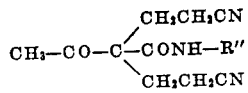

wherein R″ is a member of the group consisting of alkyl and aryl radicals.

2. As a new compound, a substance having the formula

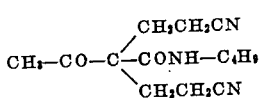

3. As a new compound, a substance having the formula

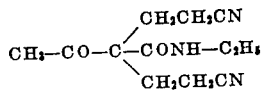

4. As a new compound, a substance of the formula

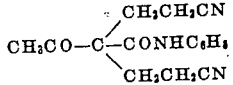

5. A process of introducing two β-cyanoethyl groups on the methylene carbon contiguous to the acetyl group of a substituted amide of acetoacetic acid, which comprises reacting acrylonitrile with said acetoacetamide in the presence of an alkaline condensing agent.

6. A process of introducing two beta-cyanoethyl groups on the methylene carbon contiguous to the acetyl group of an alkyl amide of acetoacetic acid, which comprises reacting acrylonitrile with said amide in the presence of an alkaline catalyst.

7. A process of introducing two beta-cyanoethyl groups on the methylene carbon contiguous to the acetyl group of an aryl amide of acetoacetic acid, which comprises reacting acrylonitrile with said amide in the presence of an alkaline catalyst.

8. A process of introducing two β-cyanoethyl groups on the methylene carbon contiguous to the acetyl group of acetoacetic anilide which comprises reacting acrylonitrile with acetoacetic anilide in the presence of an alkaline catalyst.

9. A process which comprises reacting in the presence of an alkaline condensing agent acrylonitrile and a carboxylic amide from the group consisting of primary alkyl and aryl amides of acetoacetic acid.

10. A process which comprises reacting in the presence of an alkaline condensing agent acrylonitrile and an alkyl amide of acetoacetic acid.

11. A process which comprises reacting in the presence of an alkaline condensing agent acrylonitrile and an aryl amide of acetoacetic acid.

12. As a new compound, a substance having the formula:

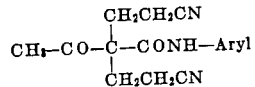

13. As a new compound, a substance having the formula:

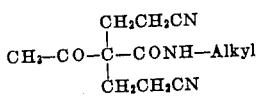

HERMAN A. BRUSON.